United States Patent
Lin et al.

(10) Patent No.: US 10,360,829 B2
(45) Date of Patent: Jul. 23, 2019

(54) HEAD-MOUNTED DISPLAY AND CHROMA ABERRATION COMPENSATION METHOD USING SUB-PIXEL SHIFTING

(71) Applicant: Acer Incorporated, New Taipei (TW)

(72) Inventors: Tzu-Chieh Lin, New Taipei (TW); Chao-Shih Huang, New Taipei (TW); Wei-Kuo Shih, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 97 days.

(21) Appl. No.: 15/786,801

(22) Filed: Oct. 18, 2017

(65) Prior Publication Data
US 2018/0268751 A1   Sep. 20, 2018

(30) Foreign Application Priority Data
Mar. 15, 2017   (TW) .............................. 106108489 A

(51) Int. Cl.
*G09G 3/00*   (2006.01)
*G09G 3/20*   (2006.01)
(Continued)

(52) U.S. Cl.
CPC ......... *G09G 3/007* (2013.01); *G02B 27/0172* (2013.01); *G02B 27/22* (2013.01);
(Continued)

(58) Field of Classification Search
CPC ..................................................... G09G 3/007
(Continued)

(56) References Cited

U.S. PATENT DOCUMENTS

| 2010/0091031 A1* | 4/2010 | Tsujimoto | G02B 27/017 345/589 |
| 2012/0032874 A1* | 2/2012 | Mukawa | G02B 3/12 345/8 |

(Continued)

FOREIGN PATENT DOCUMENTS

CN   103313079 A   9/2013

OTHER PUBLICATIONS

Chinese language office action dated Jan. 23, 2018, issued in application No. TW 106108489.

*Primary Examiner* — Long D Pham
(74) *Attorney, Agent, or Firm* — McClure, Qualey & Rodack, LLP

(57) ABSTRACT

A chroma aberration compensation method using sub-pixel shifting for use in a head-mounted display is provided. The method includes the steps of: obtaining image data from a host, wherein the image data includes a left-eye image and a right-eye image; obtaining a refraction characteristics curve corresponding to a left-eye lens and a right-eye lens and calculating a resolution of the image data; calculating a distance and a relative direction between each sub-pixel in each color channel of the image data and a center of the image data; adjusting an offset value of each sub-pixel in each color channel of the image data according to the calculated distance and relative direction; performing a sub-pixel shifting compensation process to adjust a sub-image corresponding to each color channel to generate an output image according to the offset value of each sub-pixel in each color channel of the image data.

10 Claims, 4 Drawing Sheets

(51) Int. Cl.
*G02B 27/22* (2018.01)
*G02B 27/01* (2006.01)
(52) U.S. Cl.
CPC .... *G09G 3/2003* (2013.01); *G02B 2027/0116* (2013.01); *G09G 2340/0457* (2013.01)
(58) Field of Classification Search
USPC .......................................................... 345/8
See application file for complete search history.

(56) References Cited

U.S. PATENT DOCUMENTS

2015/0009416 A1\* 1/2015 Tamayama ............... H04N 5/64
348/746
2017/0124928 A1\* 5/2017 Edwin .................... G01B 11/14

\* cited by examiner

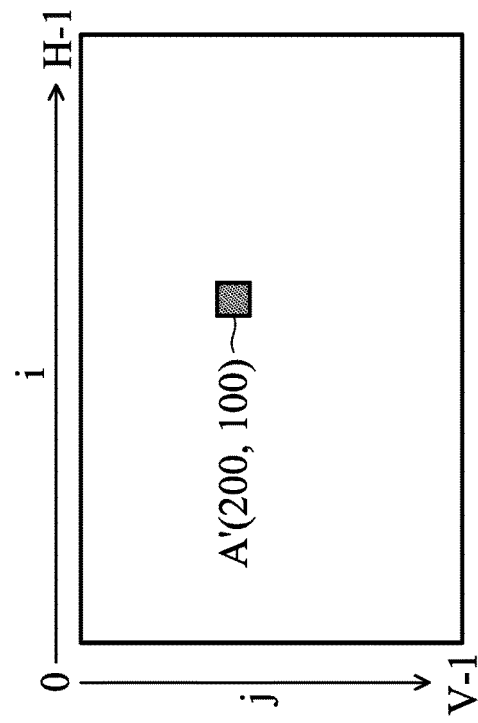
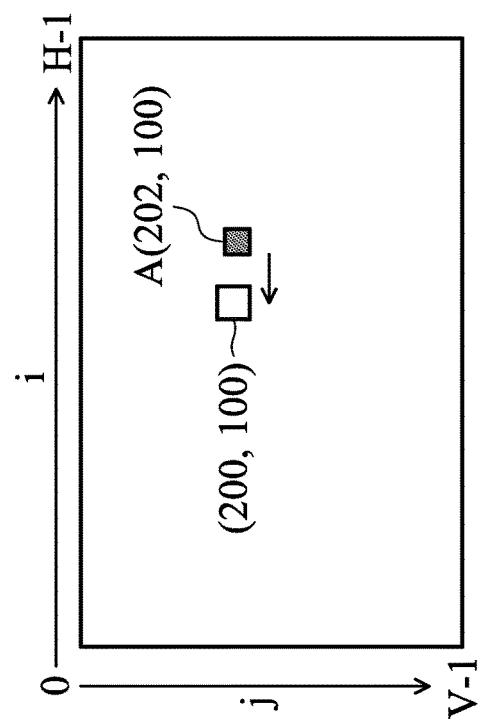
FIG. 3B
FIG. 3A

US 10,360,829 B2

HEAD-MOUNTED DISPLAY AND CHROMA ABERRATION COMPENSATION METHOD USING SUB-PIXEL SHIFTING

CROSS REFERENCE TO RELATED APPLICATIONS

This Application claims priority of Taiwan Patent Application No. 106108489, filed on Mar. 15, 2017, the entirety of which is incorporated by reference herein.

BACKGROUND OF THE INVENTION

Field of the Invention

The present invention relates to head-mounted displays, and, in particular, to a head-mounted display (HMD) and an associated chroma aberration compensation method using sub-pixel shifting.

Description of the Related Art

Head-mounted displays (HMDs) can roughly classified into two primary categories such as immersive HMDs and see-through HMDs. See-through HMDs are more suitable for augmented reality (AR) environments, and immersive HMDs are more suitable for virtual reality (VR) environments. The image display system of the immersive HMDs may include components such as display panels and optical lenses. For example, there are red, green, and blue sub-pixels in an organic light-emitting diode (OLED) display, and the red, green, and blue sub-pixels may form pixels that are used to form an image. However, in the immersive HMDs, lights emitted from the display panels are refracted by the optical lenses, and the output image can be viewed by human eyes after refraction. Since the refraction rates are different for lights with different wavelengths, "chroma aberration" will occur after the output image emitted from the display panels are refracted by the optical lenses.

FIG. 1 is an example of chroma aberration after lights are refracted by a lens. As illustrated in FIG. 1, light 130 may focus on the point 110 after being refracted by the lens 120 in an ideal situation. However, the refraction rate of the blue light (i.e. a shorter wavelength) is higher than that of the red light (i.e. a longer wavelength), and chroma aberration will occur due to different refraction rates of the blue, green, and red lights when the light 130 is refracted by a lens 120. For example, the red, green, and blue light of the light 130 may become lights 130R, 130G, and 130B after refraction, and the chroma aberration can be perceived by the user.

In view of the above, there is demand for a head-mounted display and an associated chroma aberration compensation method to solve the aforementioned problem.

BRIEF SUMMARY OF THE INVENTION

A detailed description is given in the following embodiments with reference to the accompanying drawings.

In an exemplary embodiment, a head-mounted display is provided. The head-mounted display includes: a left-eye display panel and a corresponding left-eye lens; a right-eye display panel and a corresponding right-eye lens; and a display controller. The display controller is configured to obtain image data from a host, wherein the image data comprises a left-eye image and a right-eye image. The display controller obtains a refraction characteristics curve corresponding to the left-eye lens and the right-eye lens, and calculates a resolution of the image data. The display controller further calculates a distance and a relative direction between each sub-pixel in each color channel of the image data and a center of the image data, and adjusts an offset value of each sub-pixel in each color channel of the image data according to the calculated distance and relative direction. The display controller further performs a sub-pixel shifting compensation process to adjust a sub-image corresponding to each color channel to generate an output image according to the offset value of each sub-pixel in each color channel of the image data, and displays the output image on the left-eye display panel and the right-eye display panel.

In another exemplary embodiment, a chroma aberration compensation method using sub-pixel shifting, for use in a head-mounted display is provided. The head-mounted display comprises a left-eye display panel and a corresponding left-eye lens, a right-eye display panel and a right-eye lens, and a display controller. The method includes the steps of: obtaining image data from a host, wherein the image data comprises a left-eye image and a right-eye image; obtaining a refraction characteristics curve corresponding to the left-eye lens and the right-eye lens and calculating a resolution of the image data; calculating a distance and a relative direction between each sub-pixel in each color channel of the image data and a center of the image data; adjusting an offset value of each sub-pixel in each color channel of the image data according to the calculated distance and relative direction; performing a sub-pixel shifting compensation process to adjust a sub-image corresponding to each color channel to generate an output image according to the offset value of each sub-pixel in each color channel of the image data; and displaying the output image on the left-eye display panel and the right-eye display panel.

BRIEF DESCRIPTION OF THE DRAWINGS

The present invention can be more fully understood by reading the subsequent detailed description and examples with references made to the accompanying drawings, wherein:

FIG. 3A is a diagram of shifting of sub-pixels in an image in accordance with an embodiment of the invention;

FIG. 3B is a diagram of shifting of sub-pixels in an image in accordance with an embodiment of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
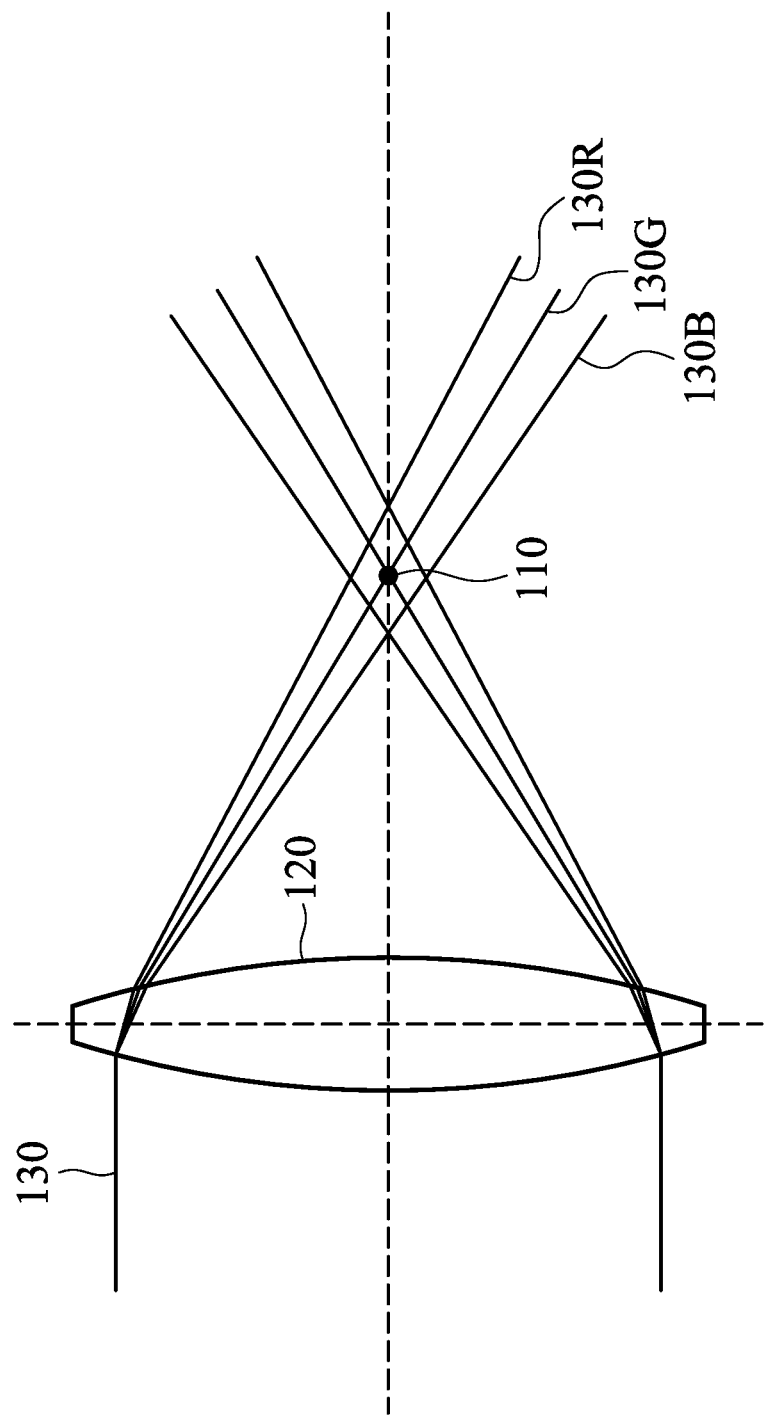
FIG. 1 is an example of chroma aberration after lights are refracted by a lens.
Figure 2:
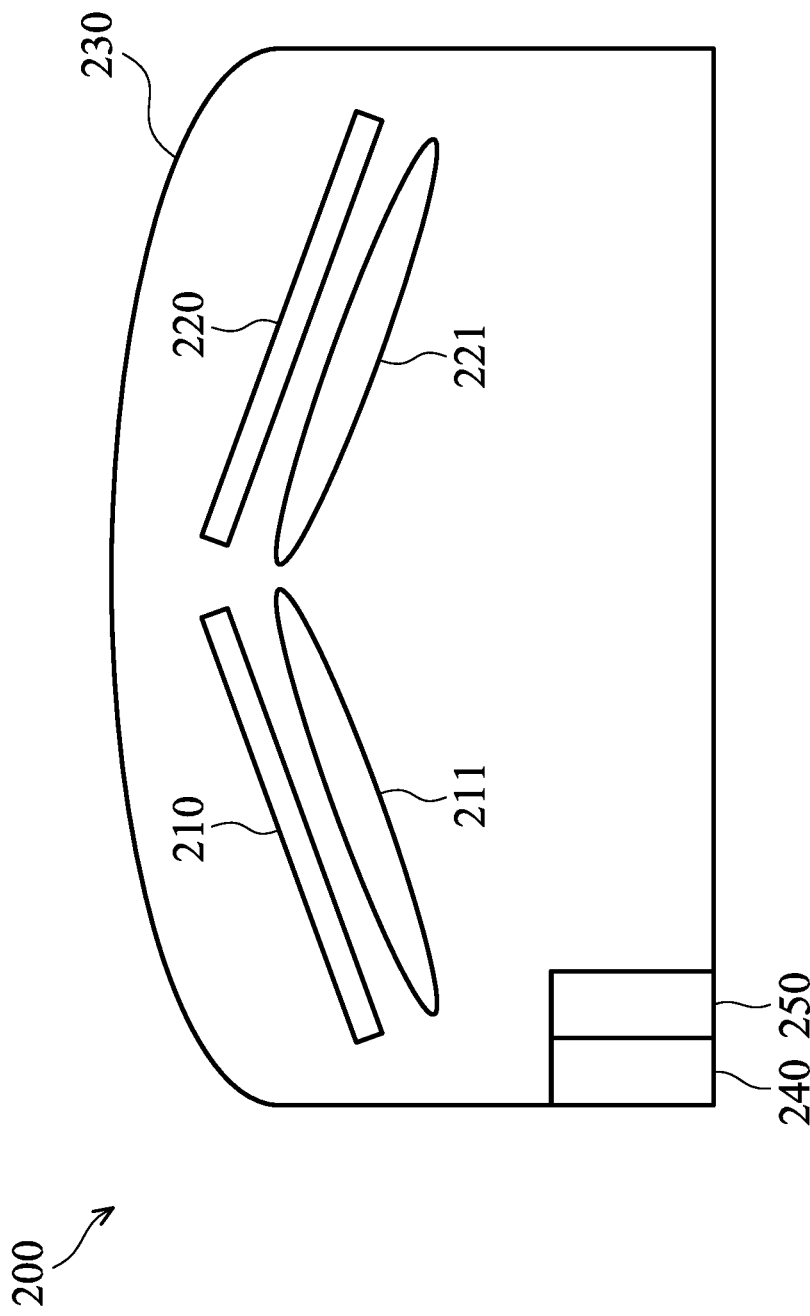
FIG. 2 is a block diagram of a head-mounted display in accordance with an embodiment of the invention.

FIG. 2 is a block diagram of a head-mounted display in accordance with an embodiment of the invention. In an embodiment, the HMD 200 includes a housing 230, a left-eye display panel 210 and a corresponding left-eye lens 211, a right-eye display panel 220 and a corresponding right-eye lens 221, a transmission interface 240, a display controller 250. The left-eye display panel 210, the left-eye lens 211, the right-eye display panel 220, and the right-eye lens 221 are disposed in the housing 230 with a predetermined optical arrangement, and the housing 230 may include a strap band or other supplemental devices (not shown) that can be worn on the user's head to view images through the HMD 200.

The transmission interface 240 is configured to receive image data (e.g. including left-eye images and right-eye images, or RGB images) from a host, and transmit the image data to the left-eye display panel 210 and the right-eye display panel 220 via the display controller 250. For example, the transmission interface may be a high-definition multimedia interface (HDMI), or a DisplayPort (DP) interface, but the invention is not limited thereto. In some embodiments, the left-eye display panel 210 and the right-eye display panel 220 can be implemented by a single display panel, and the left-eye display panel 210 and the right-eye display panel 220 are adjacent and parallel to each other, and there is no angle difference between the left-eye display panel 210 and the right-eye display panel 220.

The display controller 250 is configured to control image displaying of the left-eye display panel 210 and the right-eye display panel 220. For example, the display panel 250 may be a general-purpose processor, a digital signal processor (DSP), an image signal processor (ISP), or other equivalent circuit, that are capable of receiving the image data, such as left-eye images and right-eye images, from a host through the transmission interface 240. Upon displaying images by the HIVID 200, if the output image is not processed, chroma aberration may occur on the left-eye images and right-eye images displayed on the left-eye display panel 210 and the right-eye display panel 220 due to different refraction rates of lights in different colors. When the resolution of the image is higher, chroma aberration may more likely occurs on pixels that are farther to the center of the image. Accordingly, the display controller 250 may compensate the shifted value for the sub-pixels in different color channels of the left-eye images and right-eye images, and thus no chroma aberration will occur when the user views the left-eye images and right-eye images through the left-eye lens 211 and right-eye lens 221.

In some embodiments, the display controller 250 may include one or more timing controller (not shown in FIG. 2), and pixels in each and every column and row of the left-eye display panel 210 and right-eye display panel 220 of the HIVID 200 are controlled by the one or more timing controller of the display controller 250. In addition, the one or more timing controller can be integrated to a printed circuit board (PCB) with the left-eye display panel 210 or the right-eye display panel 220. For example, the timing controller can be implemented by a processor or a microcontroller, or integrated into the display controller 250 such as an integrated circuit (IC) or a system-on-chip (SoC), but the invention is not limited thereto.

For example, the chroma aberration on the HIVID 200 can be tested by a camera and specific test pictures such as images having black bricks. If it is detected that there is chroma aberration on the left-eye images and right-eye images displayed on the left-eye display panel 210 and the right-eye display panel 220 of the HIVID 200, the shift values of the sub-pixels in each color channel on the boundaries of the left-eye image and right-eye image can be estimated. That is, the refraction characteristic curves, indicating the offset angles of the red, green, and blue light, of the left-eye lens 211 and the right-eye lens 221 are estimated. Generally, the refraction characteristic curve of the left-eye lens 211 matches that of the right-eye lens 221, and it indicates that the left-eye lens 211 and the right-eye lens 221 have the same refraction characteristic curve. Accordingly, the display controller 250 may perform a corresponding sub-pixel shifting compensation process according to the refraction characteristic curve of the left-eye lens 211 and the right-eye lens 221.

For example, the blue sub-pixels have a greater offset value as well as the red sub-pixel have a smaller offset value. In addition, the offset value of a sub-pixel is also proportional to the distance relative to the center of the image. It should be noted that the offset value of each sub-pixel in each color channel of the image data can be calculated independently and separately in the horizontal direction and in the vertical direction.

Generally, since the green sub-pixels are the primary color component, the pixel shifting compensation process can be performed on the blue and red sub-pixels in some embodiments.

FIGS. 3A and 3B are diagrams of shifting of sub-pixels in an image in accordance with an embodiment of the invention. As illustrated in FIG. 3A, taking blue sub-pixels in the left-eye image for example, the horizontal resolution (i.e. number of pixels in the horizontal direction) and the vertical resolution (i.e. number of pixels in the vertical direction) of the left-eye image are H and V, respectively. In an embodiment, if the blue sub-pixel of pixel A has original coordinates (202, 100) in the image data from the host. After the image data has been refracted by the left-eye lens 211, the coordinates of the pixel A observed by the user have a 2-pixel offset toward right to the original coordinates of pixel A. Accordingly, the position of the blue sub-pixel should be compensated. For example, the coordinates of the blue sub-pixel of the pixel A in the original image data can be adjusted to A'(200, 100) in the output image displayed by the left-eye display panel 210, as illustrated in FIG. 3B. Accordingly, the adjusted blue sub-pixel of the pixel A may precisely focus on the coordinates (202, 100) after being refracted by the left-eye lens 211, so that the user may view images without chroma aberration.

Specifically, the offset of a given sub-pixel can be expressed by the following formula:

$$\text{SubPixel}(i, j)' = \text{SubPixel}(i - \text{Shift\_Value}_{horizontal}, j - \text{Shift\_Value}_{vertical}) \quad (1)$$

The shifted coordinates of the subpixel SubPixel(i, j)' is the coordinates of the original subpixel SubPixel(i, j) with a horizontal offset $\text{Shift\_Value}_{horizontal}$ and a vertical offset $\text{Shift\_Value}_{vertical}$, where i is an integer between 0 and (H−1), and j is an integer between 0 and (V−1).

In addition, the horizontal offset $\text{Shift\_Value}_{horizontal}$ and the vertical offset $\text{Shift\_Value}_{vertical}$ correspond to the distance D between the sub-pixel and the center of the image, where the distance D can be expressed by the following formula:

$$D = \sqrt{\left(i - \frac{(H-1)}{2}\right)^2 + \left(j - \frac{(V-1)}{2}\right)^2} \quad (2)$$

wherein i and j denote the coordinates of the sub-pixel, and ((H−1)/2, (V−1)/2) are the coordinates of the center of the image.

Generally, when the distance between the sub-pixel and the center of the image is longer, it indicates that the sub-pixel has a greater offset value. When the distance between the sub-pixel and the center of the image is shorter, it indicates that the sub-pixel has a smaller offset value. In an embodiment, the offset value of the sub-pixel is linearly proportional to the distance D, but the invention is not limited thereto. When the resolution of the image is higher, the distance between the center of the image and pixels on the boundaries of the image is also longer, and thus the offset values of the sub-pixels on the boundaries become larger. If the calculated offset value is not an integer, the display controller 250 may perform interpolation calculation to obtain the pixel values of the sub-pixels to be compensated.

The boundary conditions of the images are processed separately. For example, if the coordinates of the sub-pixel to be compensated exceed the image boundaries, the sub-pixel on the closest boundary of the image can be duplicated as the compensated sub-pixel. For example, if the coordinates of the sub-pixel to be compensated exceed the upper boundary of the image, the sub-pixel on the upper boundary can be duplicated as the sub-pixel to be compensated. Alternatively, if the coordinates of the sub-pixel to be compensated exceed the right boundary of the image, the sub-pixel on the right boundary can be duplicated as the sub-pixel to be compensated.

It should be noted that the operations are based on the blue sub-pixels in the aforementioned embodiments, and the same operations can be used on the refraction cursed of the red sub-pixels and blue sub-pixels for chroma aberration compensation using sub-pixel shifting.

For example, in a scenario, the timing controller may directly and respectively display the left-eye image and the right-eye image from the display controller 250 on the left-eye display panel 210 and the right-eye display panel 220, and the left-eye image and the right-image are not processed by the pixel-shifting process. That is, in the scenario, the chroma aberration compensation is performed by the display controller 250 in the invention.

In another scenario, the timing controller may perform the aforementioned chroma aberration compensation process on the left-eye image and right-image using pixel shifting. That is, the display panel side (i.e. the timing controller and the display panel) may automatically determine the level of chroma aberration of the received image and perform a corresponding pixel-shifting process for chroma aberration compensation. In some embodiments, the display controller 250 can be omitted, and the timing controller may directly receive image data from the host and perform a corresponding chroma aberration process.

Figure 4:
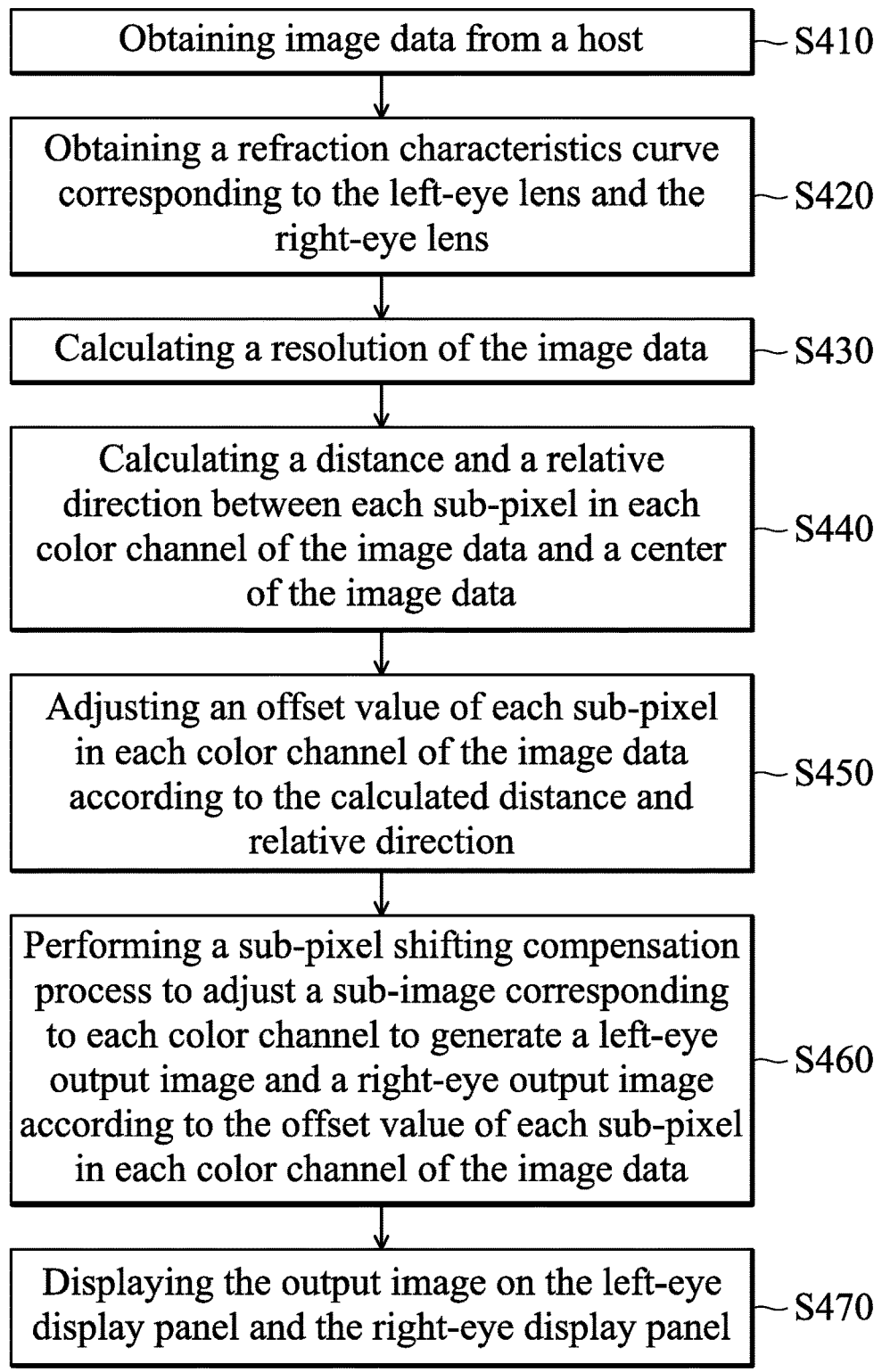
FIG. 4 is a flow chart of a chroma aberration compensation method using sub-pixel shifting in accordance with an embodiment of the invention.

FIG. 4 is a flow chart of a chroma aberration compensation method using sub-pixel shifting in accordance with an embodiment of the invention. In step S410, image data is retrieved from a host. For example, the image data (e.g. including left-eye images and right-eye images) are transmitted to the display controller 250 from the host through the transmission interface 240.

In step S420, refraction characteristic curves of a right-eye lens and a left-eye lens are obtained. For example, the refraction characteristic curves of the right-eye lens and the left-eye lens can be estimated by using a camera and test pictures with specific test patterns in advance. Accordingly, the display controller 250 may determine the offset value (i.e. sub-pixel shifting for chroma aberration compensation) of each sub-pixel in each color channel under different resolutions according to the obtained refraction characteristic curves.

In step S430, the resolution of the image data is calculated. For example, when the distance between a sub-pixel and the center of the image is longer, it indicates that the sub-pixel has a greater offset value. When the distance between a sub-pixel and the center of the image is shorter, it indicates that the sub-pixel has a smaller offset value. In an embodiment, the offset value of the sub-pixel is linearly proportional to the distance D, but the invention is not limited thereto. When the image data has a higher resolution, the distance between pixels on the boundaries of the image and the center of the image will also become longer, and thus the sub-pixels on the boundaries of the image have greater offset values. If the calculated offset value for a sub-pixel is not an integer, the display controller 250 may use interpolation calculation to obtain the offset value of the sub-pixel to be compensated.

In step S440, a distance and relative direction between each sub-pixel in each color channel of the image data and the center of the image data are calculated. For example, the distance between a sub-pixel on the boundaries of the image data and the center of the image data is dependent on the horizontal resolution and the vertical resolution of the image data.

In step S450, the offset value of each sub-pixel in each color channel is adjusted according to the calculated distance and relative direction for each sub-pixel.

In step s460, a sub-pixel shifting process is performed according to the calculated offset value of each sub-pixel in each color channel to adjust the sub-image in each color channel to generate a left-eye output image and a right-eye output image. It should be noted that processes for generating the output image for each color channel are performed separately.

In step S470, the left-eye output image and the right-eye output image are displayed on the left-eye display panel 210 and the right-eye display panel 220, respectively. It should be noted that the display controller or timing controller can be used individually or in combination, as described in the aforementioned embodiments, and the chroma aberration compensation method using sub-pixel shifting can be performed by the display controller or the timing controller.

In view of the above, a head-mounted display and a chroma aberration compensation method using sub-pixel shifting are provided in the invention. By adjusting the offset value of each sub-pixel in each color channel of the image data in advance, the lights of different color channels in the image data that is displayed on the display panel may precisely focus on the same point after being refracted by the lenses, and thus the user will not observe output images with chroma aberration. Accordingly, the head-mounted display and the chroma aberration compensation method using sub-pixel shifting provided in the invention are capable of solving the chroma aberration problem of the output image that is caused by different refraction rates of lights in different color channels.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A head-mounted display, comprising:
   a left-eye display panel and a corresponding left-eye lens;
   a right-eye display panel and a corresponding right-eye lens;

a display controller, configured to obtain image data from a host, wherein the image data comprises a left-eye image and a right-eye image, and the display controller obtains a refraction characteristics curve corresponding to the left-eye lens and the right-eye lens, and calculates a resolution of the image data, wherein the display controller further calculates a distance and a relative direction between each sub-pixel in each color channel of the image data and a center of the image data, and adjusts an offset value of each sub-pixel in each color channel of the image data according to the calculated distance and relative direction, wherein the display controller further performs a sub-pixel shifting compensation process to adjust a sub-image corresponding to each color channel to generate an output image according to the offset value of each sub-pixel in each color channel of the image data, and displays the output image on the left-eye display panel and the right-eye display panel.

2. The head-mounted display as claimed in claim 1, wherein the refraction characteristic curve records offset angles corresponding to blue light, green light, and red light that pass through the left-eye lens and the right-eye lens.

3. The head-mounted display as claimed in claim 1, wherein the offset value of each sub-pixel in each color channel of the image data is linearly proportional to the calculated distance.

4. The head-mounted display as claimed in claim 3, wherein when the calculated offset value of each sub-pixel is not an integer, the display controller performs interpolation to calculate a pixel value of the sub-pixel to be compensated.

5. The head-mounted display as claimed in claim 3, wherein the offset value comprises a horizontal offset value and a vertical offset value, and the display controller independently calculates the horizontal offset value and the vertical offset value.

6. A chroma aberration compensation method using sub-pixel shifting, for use in a head-mounted display, wherein the head-mounted display comprises a left-eye display panel and a corresponding left-eye lens, a right-eye display panel and a right-eye lens, and a display controller, the method comprising:

obtaining image data from a host, wherein the image data comprises a left-eye image and a right-eye image;

obtaining a refraction characteristics curve corresponding to the left-eye lens and the right-eye lens and calculating a resolution of the image data;

calculating a distance and a relative direction between each sub-pixel in each color channel of the image data and a center of the image data;

adjusting an offset value of each sub-pixel in each color channel of the image data according to the calculated distance and relative direction;

performing a sub-pixel shifting compensation process to adjust a sub-image corresponding to each color channel to generate an output image according to the offset value of each sub-pixel in each color channel of the image data; and displaying the output image on the left-eye display panel and the right-eye display panel.

7. The method as claimed in claim 6, wherein the refraction characteristic curve records offset angles corresponding to blue light, green light, and red light that pass through the left-eye lens and the right-eye lens.

8. The method as claimed in claim 6, wherein the offset value of each sub-pixel in each color channel of the image data is linearly proportional to the calculated distance.

9. The method as claimed in claim 8, further comprising:
when the calculated offset value of each sub-pixel is not an integer, performing interpolation to calculate a pixel value of the sub-pixel to be compensated.

10. The method as claimed in claim 8, wherein the offset value comprises a horizontal offset value and a vertical offset value, and the method further comprises:
independently and separately calculating the horizontal offset value and the vertical offset value.

* * * * *